US012780094B2

(12) United States Patent
Kudo

(10) Patent No.: US 12,780,094 B2
(45) Date of Patent: Nov. 3, 2026

(54) HITCH ANGLE DETECTION SYSTEM

(71) Applicant: ALPS ALPINE CO., LTD., Tokyo (JP)

(72) Inventor: Nobunori Kudo, Fukushima (JP)

(73) Assignee: ALPS ALPINE CO. LTD., Tokyo (JP)

( * ) Notice: Subject to any disclaimer, the term of this patent is extended or adjusted under 35 U.S.C. 154(b) by 78 days.

(21) Appl. No.: 18/653,379

(22) Filed: May 2, 2024

(65) Prior Publication Data

US 2024/0383403 A1 Nov. 21, 2024

(30) Foreign Application Priority Data

May 19, 2023 (JP) ................................ 2023-083260

(51) Int. Cl.
*B60R 1/00* (2022.01)
*B60R 1/26* (2022.01)

(52) U.S. Cl.
CPC ................ *B60R 1/003* (2013.01); *B60R 1/00* (2013.01); *B60R 1/26* (2022.01)

(58) Field of Classification Search
CPC .. G06T 7/73; G07T 7/73; G01B 11/26; H04N 5/445; H04N 5/44504; H04N 5/23293; H04N 7/18; B60D 1/36; B60R 1/00; B60R 1/25; B60R 1/26
See application file for complete search history.

(56) References Cited

U.S. PATENT DOCUMENTS

2003/0234512 A1* 12/2003 Holub ...................... B60D 1/36 280/432
2017/0078653 A1* 3/2017 Bi ............................ B60R 1/31
2017/0280091 A1* 9/2017 Greenwood ........... G06T 11/00
2022/0371514 A1 11/2022 Castro
2023/0215183 A1* 7/2023 Bahramgiri ............. B60D 1/62 382/104

(Continued)

FOREIGN PATENT DOCUMENTS

DE 102016117284 3/2018
DE 102017130121 6/2019

(Continued)

OTHER PUBLICATIONS

Extended European Search Report for EP24176191.5 mailed on Oct. 10, 2024.
European Office Action for 24176191.5 mailed on Feb. 5, 2026.

*Primary Examiner* — Van T Trieu
(74) *Attorney, Agent, or Firm* — IPUSA, PLLC

(57) ABSTRACT

A hitch angle detection system to detect a trailer hitch angle with a simple, versatile configuration is provided. Edge detection is performed in a portion including an image of a rear bumper of a tractor and an image of a front bumper of a trailer, the portion being included in an image captured by a rear camera, to extract an edge of the tractor rear bumper image and an edge of the trailer front bumper image. A straight line with which the edge of the rear bumper image is best approximated is calculated as a straight line parallel with the tractor left-right direction. A straight line with which the edge of the trailer front bumper image is best approximated is calculated as a straight line parallel with the trailer left-right direction. The relative angle of the straight line to the straight line is calculated as the trailer hitch angle.

4 Claims, 12 Drawing Sheets

(56) References Cited

U.S. PATENT DOCUMENTS

| | | | | |
|---|---|---|---|---|
| 2024/0326909 | A1 | 10/2024 | Poveda Carias et al. | |
| 2025/0292428 | A1* | 9/2025 | Tokoro | G06T 7/60 |

FOREIGN PATENT DOCUMENTS

| | | |
|---|---|---|
| DE | 102022003080 | 11/2022 |
| EP | 3291137 | 3/2018 |
| JP | 2002068032 | 3/2002 |
| JP | 2003148938 | 5/2003 |
| JP | 2016-081198 | 5/2016 |
| JP | 2016-137802 | 8/2016 |
| JP | 2019-199150 | 11/2019 |
| JP | 2020-001631 | 1/2020 |
| JP | 2021-177145 | 11/2021 |
| JP | 2022-547068 | 11/2022 |
| WO | 2019/115418 | 6/2019 |
| WO | 2023/066610 | 4/2023 |

* cited by examiner

HITCH ANGLE DETECTION SYSTEM

CROSS-REFERENCE TO RELATED APPLICATION

The present application claims priority under 35 U.S.C. § 119 to Japanese Patent Application No. 2023-083260, filed May 19, 2023, the contents of which are incorporated herein by reference in their entirety.

BACKGROUND OF THE INVENTION

Field of the Invention

The present disclosure relates to a technique of detecting a hitch angle of a trailer.

Description of the Related Art

A technique known as a technique for detecting a hitch angle of a trailer, which is a rotation angle of a trailer swingably coupled to a hitch ball of a tractor about the axis of the hitch ball, recognizes a straight line corresponding to the center axis of a drawbar of the trailer from an image of a portion at which the tractor and the trailer are coupled, the image being captured by a camera, and detects the angle of the recognized straight line with respect to a vehicle's left-right direction center axis of the tractor, as the hitch angle of the trailer (for example, Japanese Patent Application Laid-Open Publication No. 2020-1631).

A technique also known as a technique for detecting a hitch angle of a trailer measures the distances from a tractor to both the left and right ends of a trailer in the front-rear direction of the tractor using a laser range finder, and calculates a hitch angle of the trailer based on the distance between the left and right ends and the measured distances in the front-rear direction of the tractor (for example, Japanese Patent Application Laid-Open Publication No. 2021-177145).

A technique also known as a technique for detecting a hitch angle of a trailer detects a hitch angle of a trailer based on the inclination of an image of a marker pasted on the upper surface of a drawbar of the trailer, the image being captured by a camera (for example, Japanese Patent Application Laid-Open Publication No. 2019-199150).

A technique known as a technique for utilizing a detected hitch angle of a trailer calculates a relative positional relationship between a tractor and a trailer based on a detected hitch angle when the tractor is reversing, calculates a movement trajectory of the trailer predictable in a case of continuing to reverse the tractor without change in course based on the calculated positional relationship, and displays the calculated movement trajectory while overlaying it on an image of the rear view of the trailer captured by a camera situated on a rear portion of the trailer (for example, Japanese Patent Application Laid-Open Publication No. 2016-137802).

In relation with a system configured to generate a panorama view image representing a wide view around a tractor by synthesizing images captured by three cameras situated on left and right side portions and a rear portion of a trailer and display a partial range of the generated panorama view image to a driver, a technique known as a technique for utilizing a detected hitch angle of a trailer switches the range of the panorama view image that is to be displayed in accordance with a detected hitch angle (for example, Japanese Translation of PCT International Publication No. JP-T-2022-547068).

A technique also known as a technique for utilizing a detected hitch angle of a trailer predicts a collision between a tractor and a trailer based on a detected hitch angle and a steered angle of the tractor when the tractor is reversing, and performs a process to avoid the collision (for example, Japanese Patent Application Laid-Open Publication No. 2016-81198).

SUMMARY OF THE INVENTION

Drawbars of trailers have various shapes such as a straight line shape, a Y-letter shape, and the like. Depending on the shape of the drawbar, the aforementioned technique of detecting a hitch angle based on a straight line recognized from an image of a coupled portion may not be able to detect the hitch angle correctly.

When employing the technique of detecting a hitch angle using a laser range finder, it is necessary to furnish the tractor and the trailer with special equipment such as a marker, a laser range finder, and the like, and to calibrate each of them separately, lacking in simplicity.

The technique of detecting a hitch angle using a marker pasted on the upper surface of a drawbar is not applicable in a case where the shape of the drawbar or the upper surface of the drawbar is not suitable for a marker to be pasted.

Hence, an object of the present disclosure is to realize detection of a hitch angle of a trailer with a more simple and versatile configuration.

To achieve the object described above, the present disclosure provides a hitch angle detection system, which is configured to detect a hitch angle of a trailer pulled by a tractor, with a camera situated on the tractor such that a front portion of the trailer is included in an image capturing range regardless of the hitch angle of the trailer, a left-right direction calculator configured to calculate a left-right direction of the trailer based on an image of a member of the trailer extending to a left and a right of the trailer, the image of the member being reflected in an image captured by the camera, and a hitch angle calculator configured to calculate a relative angle of the left-right direction of the trailer, which is calculated, with respect to a left-right direction of the tractor as the hitch angle of the trailer.

Here, in the hitch angle detection system, the member of the trailer extending to the left and the right of the trailer may be a member forming a front edge of the trailer, and the left-right direction calculator may calculate a direction in which a straight line, with which a line representing the front edge of the trailer reflected in the image captured by the camera is approximated, extends as the left-right direction of the trailer.

In the hitch angle detection system described above, the camera may be situated on the tractor such that a rear portion of the tractor and the front portion of the trailer are included in the image capturing range regardless of the hitch angle of the trailer, the left-right direction calculator may calculate the left-right direction of the tractor based on an image of a member of the tractor extending to a left and a right of the tractor, the image of the member of the tractor being reflected in the image captured by the camera, and the hitch angle calculator may calculate the relative angle of the left-right direction of the trailer calculated by the left-right direction calculator with respect to the left-right direction of the tractor calculated by the left-right direction calculator as the hitch angle of the trailer.

In this case, the member of the tractor extending to the left and the right of the tractor may be a member forming a rear edge of the tractor, and the left-right direction calculator may calculate a direction in which a straight line, with which a line representing the rear edge of the tractor reflected in the image captured by the camera is approximated, extends as the left-right direction of the tractor.

The hitch angle detection system described above can detect the hitch angle of the trailer correctly regardless of the shape of the drawbar of the trailer. Moreover, it is possible to detect the hitch angle of the trailer without furnishing the tractor and the trailer with special equipment but by using a back camera gaining widespread use for rear view confirmation in reversing, as the camera of the hitch angle detection system.

To achieve the object described above, the present disclosure provides a hitch angle detection system, which is configured to detect a hitch angle of a trailer pulled by a tractor, with a camera situated on the tractor such that a front portion of the trailer is included in an image capturing range regardless of the hitch angle of the trailer, a marker pasted on a position that is on the front portion of the trailer and is included in the image capturing range of the camera such that the marker indicates a left-right direction of the trailer, a left-right direction calculator configured to calculate the left-right direction of the trailer indicated by an image of the marker reflected in an image captured by the camera, and a hitch angle calculator configured to calculate a relative angle of the left-right direction of the trailer, which is calculated, with respect to a left-right direction of the tractor as the hitch angle of the trailer.

With this configuration, it is possible to detect the hitch angle θ of the trailer regardless of the shape and structure of the trailer, only by pasting a marker on the trailer itself, on which it is easier to secure a suitable pasting space than on the upper surface of the drawbar and the like.

As described above, the present disclosure can realize detection of a hitch angle of a trailer with a more simple and versatile configuration.

DESCRIPTION OF THE EMBODIMENTS

An embodiment of the present disclosure will be described below.

Figure 1:
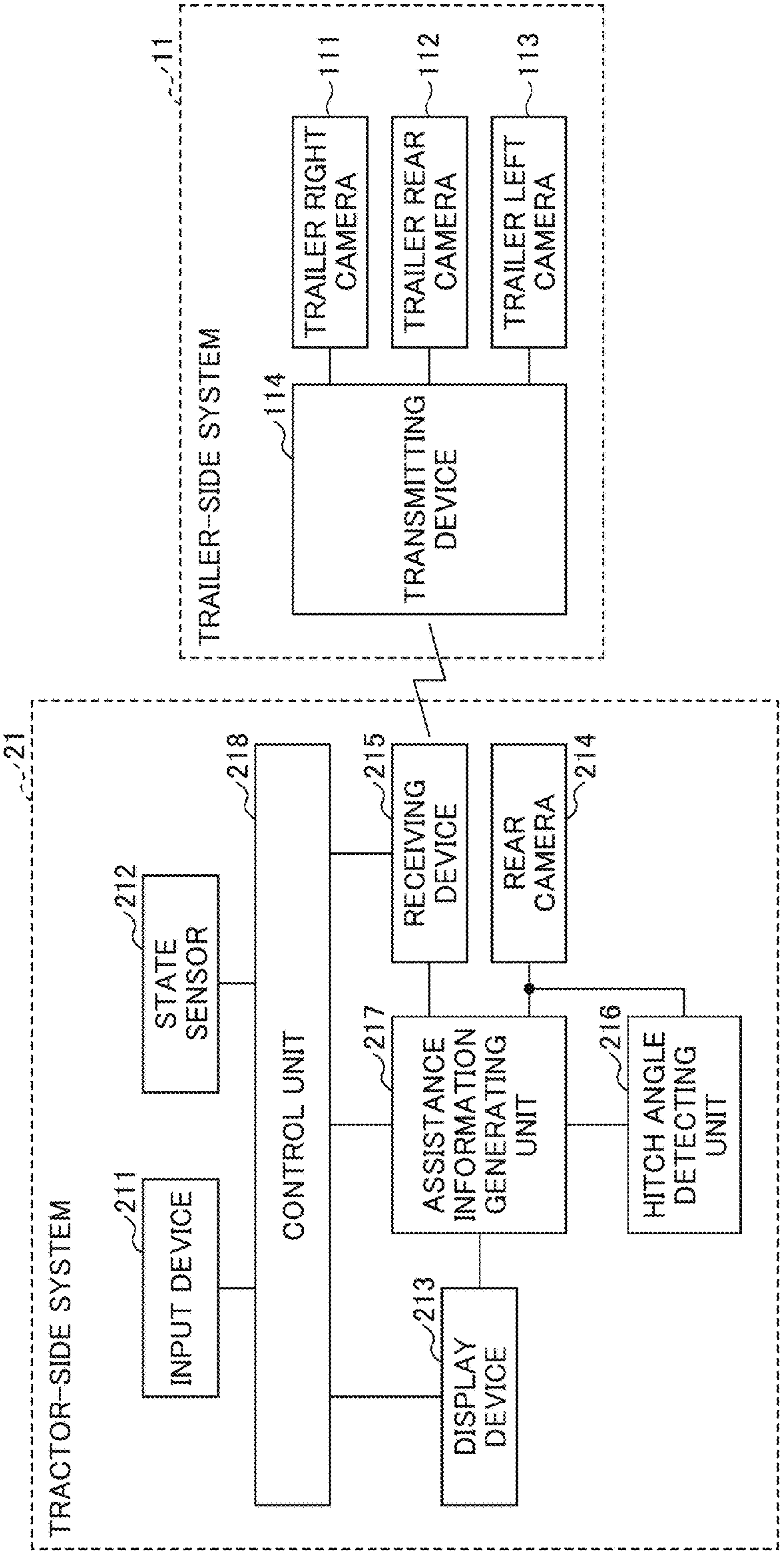
FIG. 1 is a block diagram illustrating the configuration of a drive assisting system according to an embodiment of the present disclosure.

FIG. 1 illustrates the configuration of a drive assisting system according to the present embodiment.

Figure 2A:
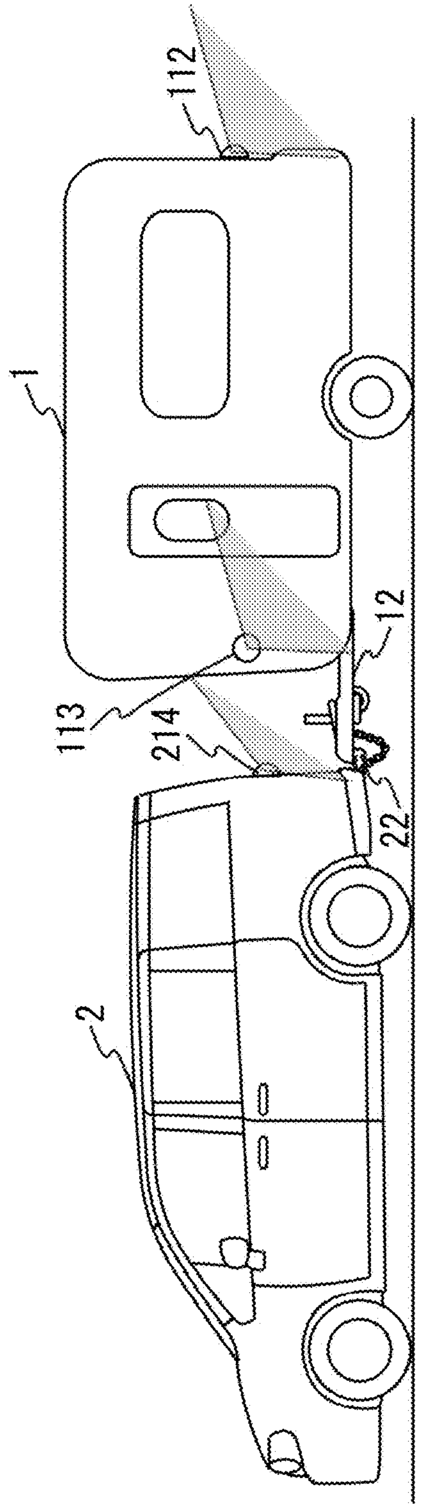
FIG. 2A is a view illustrating a tractor and a trailer according to an embodiment of the present disclosure.
Figure 2B:
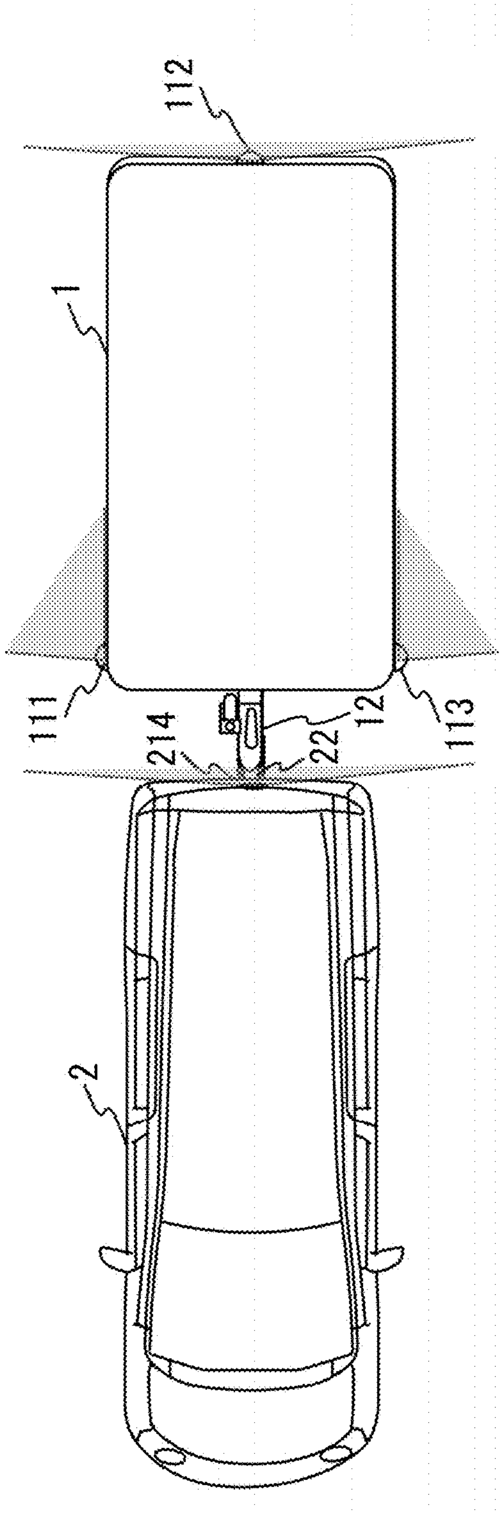
FIG. 2B is a view illustrating a tractor and a trailer according to an embodiment of the present disclosure.

Here, the drive assisting system illustrated in FIG. 1 is configured to assist in driving of a tractor 2 configured to pull a trailer 1 such as a camping trailer and the like illustrated in FIG. 2A and FIG. 2B.

Referring back to FIG. 1, the drive assisting system includes a trailer-side system 11 mounted on the trailer 1, and a tractor-side system 21 mounted on the tractor 2.

The trailer-side system 11 includes three cameras including a trailer right camera 111, a trailer rear camera 112, and a trailer left camera 113, and a transmitting device 114 configured to wirelessly transmit images captured by the cameras to the tractor-side system 21.

The tractor-side system 21 includes an input device 211, a state sensor 212 configured to detect various states of the tractor 2 such as the forward/reverse travelling state of the tractor 2, the steered angle of the tractor 2, and the like, a display device 213, a rear camera 214, a receiving device 215 configured to receive images wirelessly transmitted from the transmitting device 114 of the trailer-side system 11, a hitch angle detecting unit 216 configured to detect a hitch angle of the trailer 1 using an image captured by the rear camera 214, an assistance information generating unit 217 configured to generate various assistance information for assisting in driving of the tractor 2 using images captured by the trailer right camera 111, the trailer rear camera 112, and the trailer left camera 113, received by the receiving device 215, an image captured by the rear camera 214, the hitch angle detected by the hitch angle detecting unit 216, and the like, and to display the assistance information on the display device 213, and a control unit 218 configured to control each of the units described above.

The images captured by the trailer right camera 111, the trailer rear camera 112, and the trailer left camera 113 may be transmitted from the trailer-side system 11 to the tractor-side system 21 by wired transmission. In this case, the transmitting device 114 and the receiving device 215 are omitted, and the images captured by the trailer right camera 111, the trailer rear camera 112, and the trailer left camera 113 are directly transmitted to the assistance information generating unit 217.

Next, as illustrated in FIG. 2A and FIG. 2B, the trailer right camera 111 of the trailer-side system 11 captures an image of the rear view from the front end of the right surface of the trailer 1, the trailer rear camera 112 captures an image of the rear view from the left-right direction center of the rear portion of the trailer 1, and the trailer left camera 113 captures an image of the rear view from the front end of the left surface of the trailer 1.

The rear camera 214 of the tractor-side system 21 captures a wide-angle image of the rear view from the left-right direction center of the rear portion of the tractor 2. Here, the image capturing range of the rear camera 214 is set such that a captured image includes: a rear end portion of the tractor 2 such as the rear bumper of the tractor 2 and the like; and a front end portion of the trailer 1 such as the front bumper of the trailer 1, the front ends of the chassis and the body of the trailer 1, and the like.

A drawbar 12 coupling with the chassis extends from a lower portion of the front end of the trailer 1 to ahead of the trailer 1. By a coupler situated on the front end of the drawbar 12 being swingably engaged with a hitch ball situated on the rear end of a hitch member 22 extending to behind the tractor 2 from a lower portion of the rear end of the tractor 2, the trailer 1 is coupled to the tractor 2.

Figure 3A:
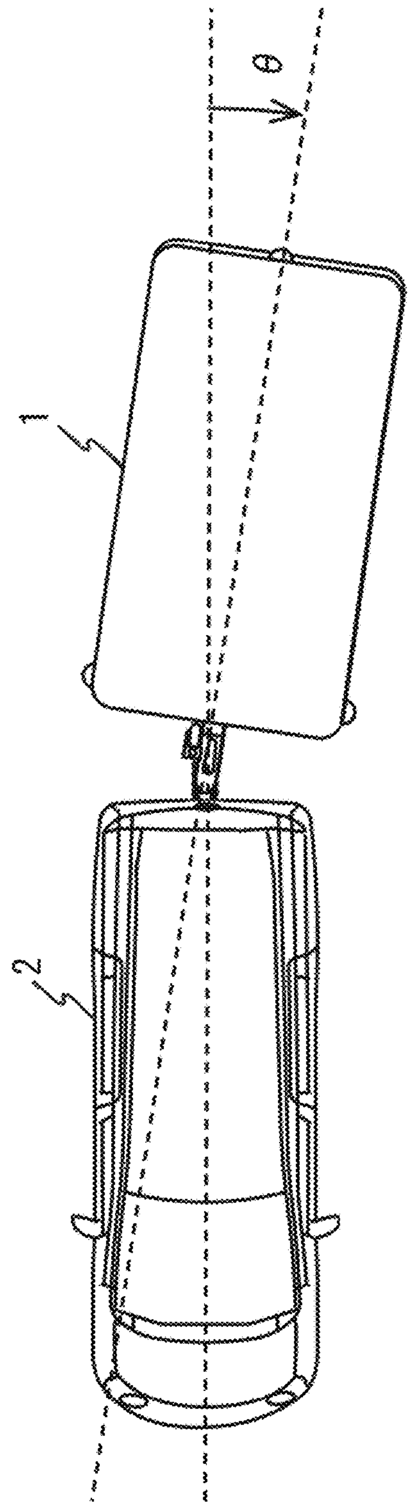
FIG. 3A is a view illustrating a hitch angle to be detected according to an embodiment of the present disclosure.
Figure 3B:
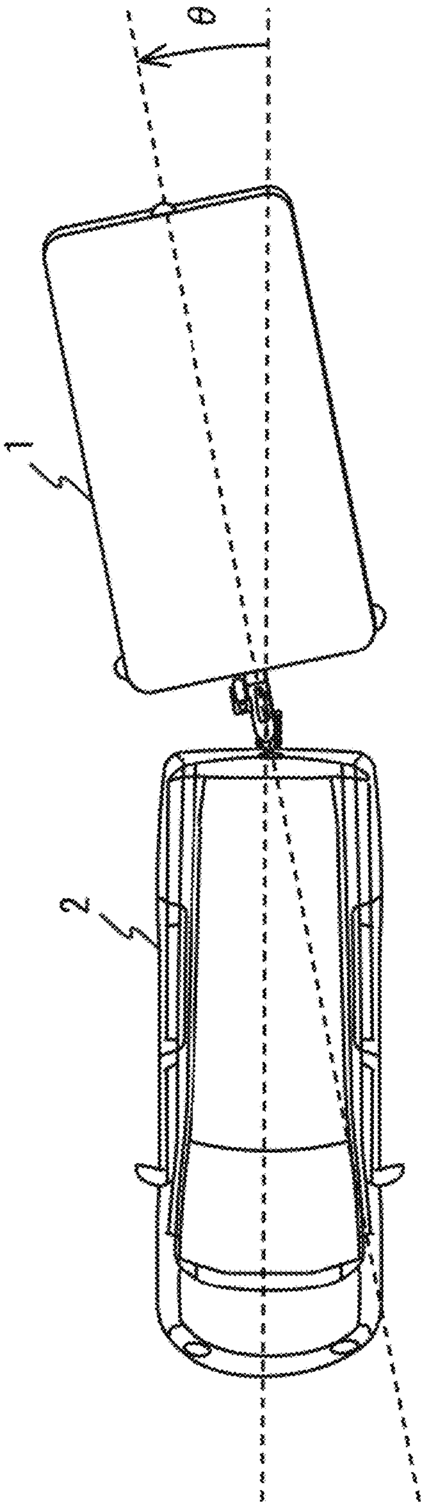
FIG. 3B is a view illustrating a hitch angle to be detected according to an embodiment of the present disclosure.

Hence, as illustrated in FIG. 3A and FIG. 3B, the trailer 1 can swing with respect to the tractor 2 about the center axis of the coupler and the hitch ball. The angle of the swinging, denoted by e in the figures, is the hitch angle of the trailer 1.

Detection of the hitch angle of the trailer 1, which is performed by the hitch angle detecting unit 216 using an image captured by the rear camera 214 will be described below.

The hitch angle detecting unit 216 extracts a portion including the image of the rear end portion of the tractor 2 and the image of the front end portion of the trailer 1 from an image captured by the rear camera 214, and, by image recognition, recognizes a line extending in the left-right direction of the tractor 2 such as the line representing the rear edge of the tractor 2, and a line extending in the left-right direction of the trailer 1 such as the line representing the front edge of the trailer 1, the lines being reflected in the extracted image.

Then, the hitch angle detecting unit 216 calculates a first straight line, with which the recognized line extending in the left-right direction of the tractor 2 is the best approximated, as a straight line parallel with the left-right direction of the tractor 2, and a second straight line, with which the recognized line extending in the left-right direction of the trailer 1 is the best approximated, as a straight line parallel with the left-right direction of the trailer 1.

Then, the hitch angle detecting unit 216 calculates a relative angle of the second straight line with respect to the first straight line as the hitch angle θ of the trailer 1.

That is, detection of the hitch angle is performed as follows, for example.

Figure 4A:
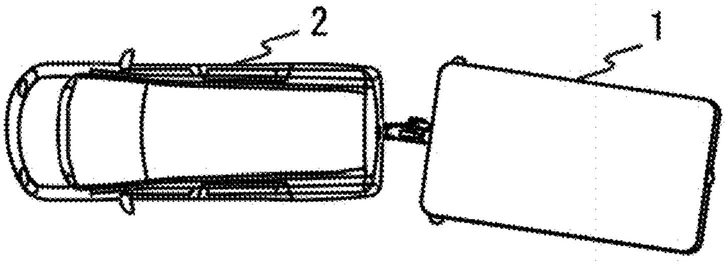
FIG. 4A is a drawing illustrating an example in which a hitch angle is detected according to an embodiment of the present disclosure.
Figure 4B:
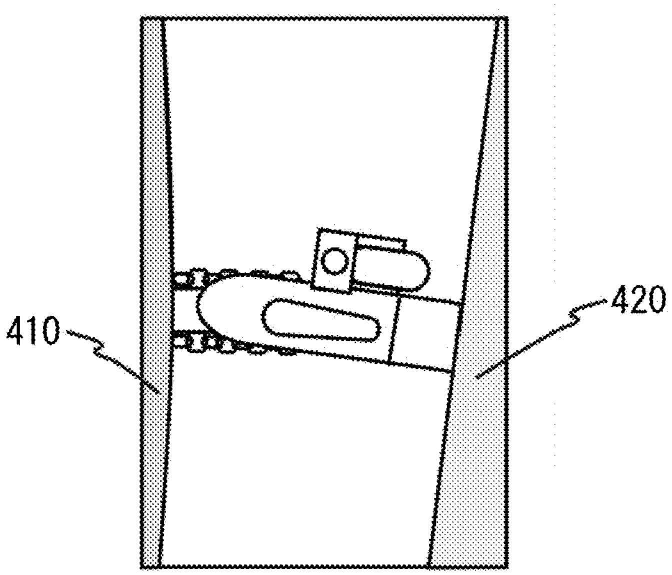
FIG. 4B is a drawing illustrating an example in which a hitch angle is detected according to an embodiment of the present disclosure.

In a case where the current positioning relationship between the tractor 2 including a rear bumper and the trailer 1 including a front bumper is as illustrated in FIG. 4A, the hitch angle detecting unit 216 extracts a portion including an image 410 of the rear bumper of the tractor 2 and an image 420 of the front bumper of the trailer 1 as illustrated in FIG. 4B from an image captured by the rear camera 214.

Figure 4C:
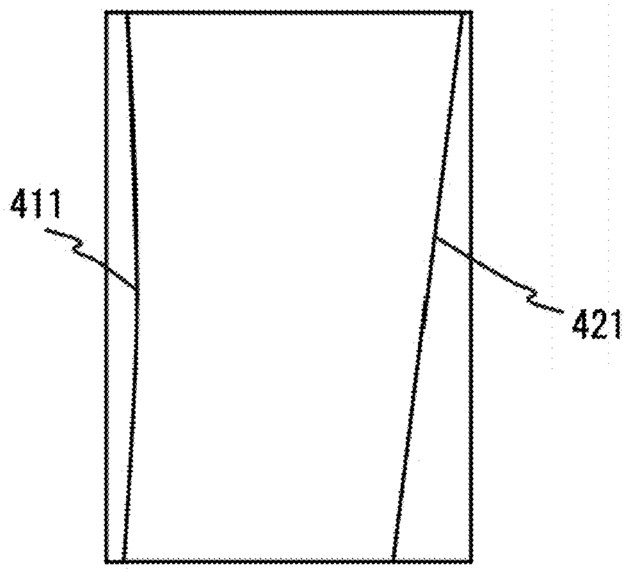
FIG. 4C is a drawing illustrating an example in which a hitch angle is detected according to an embodiment of the present disclosure.

Then, the hitch angle detecting unit 216 performs edge detection in the extracted images illustrated in FIG. 4B, and extracts an edge 411 corresponding to the rear edge of the rear bumper of the tractor 2 and an edge 421 corresponding to the front edge of the front bumper of the trailer 1 as illustrated in FIG. 4C from among detected edges based on the positions, directions, and the like of the edges.

Figure 4D:
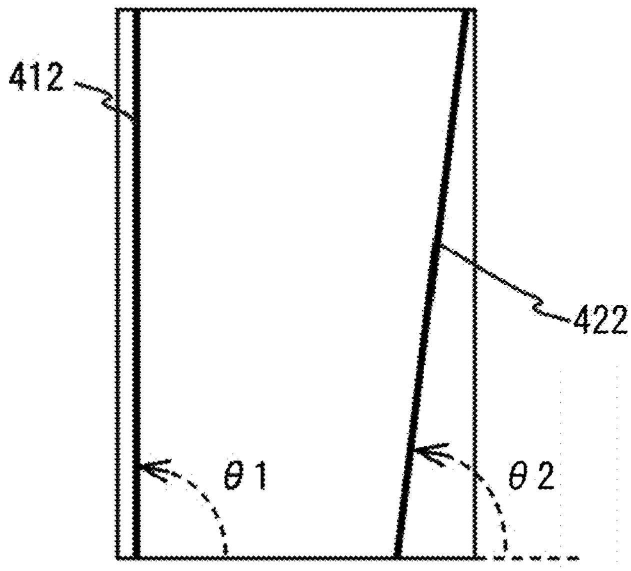
FIG. 4D is a drawing illustrating an example in which a hitch angle is detected according to an embodiment of the present disclosure.

Then, by a regression analysis or the like, the hitch angle detecting unit 216 calculates a straight line 412, with which the edge 411 corresponding to the rear edge of the rear bumper is the best approximated, as a straight line parallel with the left-right direction of the tractor 2, and calculates a straight line 422, with which the edge 421 corresponding to the front edge of the front bumper of the trailer 1 is the best approximated, as a straight line parallel with the left-right direction of the trailer 1, as illustrated in FIG. 4D.

Then, the hitch angle detecting unit 216 calculates a relative angle of the straight line 422 with respect to the straight line 412, as the hitch angle θ of the trailer 1, where the relative angle is expressed as θ2−θ1 where θ1 represents the angle of the straight line 412 and θ2 represents the angle of the straight line 422 as illustrated.

Figure 5A:
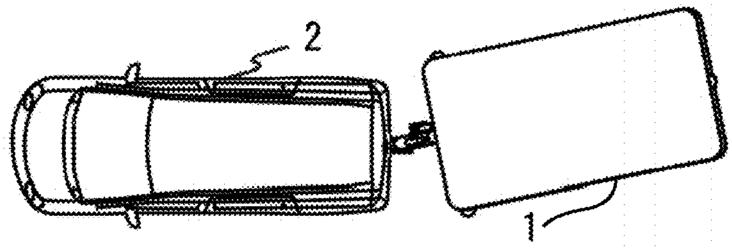
FIG. 5A is a drawing illustrating an example in which a hitch angle is detected according to an embodiment of the present disclosure.
Figure 5B:
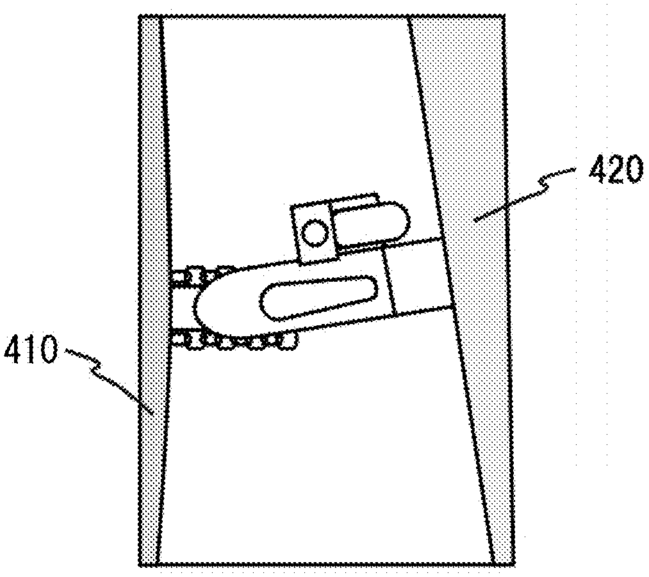
FIG. 5B is a drawing illustrating an example in which a hitch angle is detected according to an embodiment of the present disclosure.

Likewise, in a case where the positioning relationship between the tractor 2 including the rear bumper and the trailer 1 including the front bumper is as illustrated in FIG. 5A, the hitch angle detecting unit 216 extracts a portion including an image 410 of the rear bumper of the tractor 2 and an image 420 of the front bumper of the trailer 1 as illustrated in FIG. 5B from an image captured by the rear camera 214.

Figure 5C:
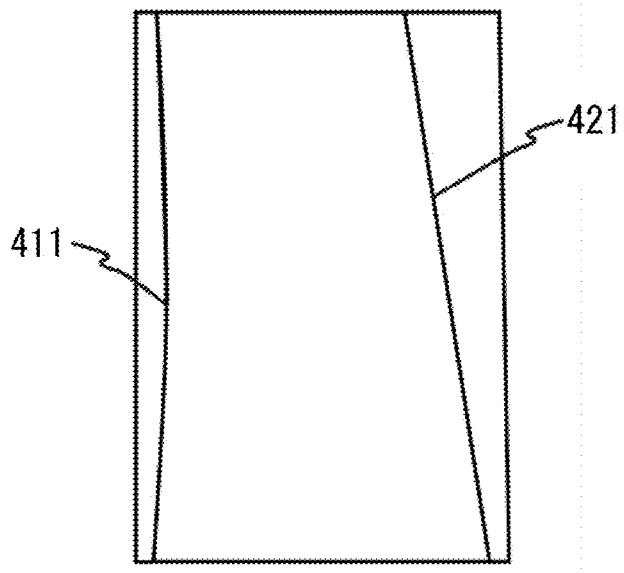
FIG. 5C is a drawing illustrating an example in which a hitch angle is detected according to an embodiment of the present disclosure.

Then, the hitch angle detecting unit 216 performs edge detection in the extracted images illustrated in FIG. 5B, and extracts an edge 411 corresponding to the rear edge of the rear bumper of the tractor 2 and an edge 421 corresponding to the front edge of the front bumper of the trailer 1 as illustrated in FIG. 5C from among detected edges based on the positions, directions, and the like of the edges.

Figure 5D:
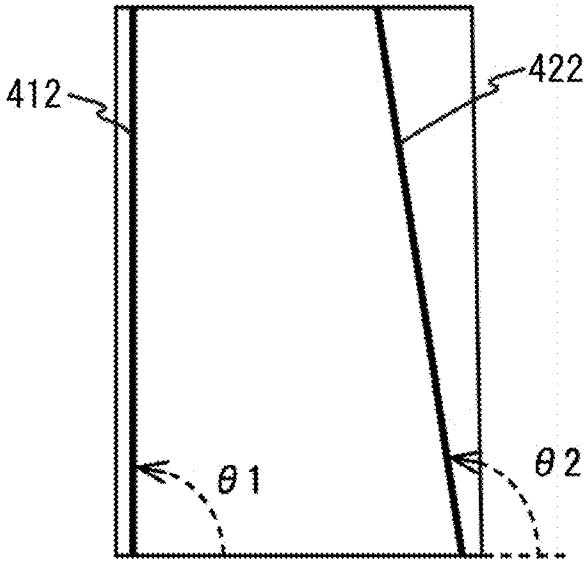
FIG. 5D is a drawing illustrating an example in which a hitch angle is detected according to an embodiment of the present disclosure.

Then, by a regression analysis or the like, the hitch angle detecting unit 216 calculates a straight line 412, with which the edge 411 corresponding to the rear edge of the rear bumper is the best approximated, as a straight line parallel with the left-right direction of the tractor 2, and calculates a straight line 422, with which the edge 421 corresponding to the front edge of the front bumper of the trailer 1 is the best approximated, as a straight line parallel with the left-right direction of the trailer 1, as illustrated in FIG. 5D.

Then, the hitch angle detecting unit 216 calculates a relative angle of the straight line 422 with respect to the straight line 412, as the hitch angle θ of the trailer 1, where the relative angle is expressed as θ2−θ1 where θ1 represents the angle of the straight line 412 and θ2 represents the angle of the straight line 422 as illustrated.

The position at which the image of the rear bumper appears in the image captured by the rear camera 214 does not change for a period of time in which the conditions (position, direction, and angular field of view) of the rear camera 214 are fixed. Hence, in this period of time, the straight line 412, with which the edge 411 corresponding to the rear edge of the rear bumper is the best approximated, may be calculated based on the image captured by the rear camera 214 only for a first calculation of the period, and the hitch angle θ may be calculated using the straight line 412 calculated for the first calculation of the period for each time calculating the hitch angle θ.

Alternatively, the angle of the left-right direction of the tractor 2 in the image captured by the rear camera 214 may be calculated previously and set fixedly, and the hitch angle θ may be calculated with the set angle substituted for the angle θ1 of the straight line 412 at each time to calculate the hitch angle θ.

Referring back to FIG. 1, under control of the control unit 218, the assistance information generating unit 217 performs, for example, a process including calculating a relative positional relationship between the tractor 2 and the trailer 1 based on the hitch angle θ detected by the hitch angle detecting unit 216 when the tractor 2 is reversing, calculating a movement trajectory of the trailer 1 predictable in a case where the tractor 2 continues to reverse without change in course based on the calculated positional relationship, and displaying the calculated movement trajectory on the display device 213 while overlaying it on images captured by the trailer right camera 111, the trailer rear camera 112, and the trailer left camera 113, a process including predicting a collision between the tractor 2 and the trailer 1 based on the hitch angle θ detected by the hitch angle detecting unit 216 and a steered angle of the tractor 2 detected by the state sensor 212 when the tractor 2 is reversing, and displaying a guidance for avoiding the collision on the display device 213, a process including synthesizing images captured by the rear camera 214, the trailer right camera 111, the trailer rear camera 112, and the trailer left camera 113 into one image widely overlooking the view around the tractor 2 from a perspective set at the rear portion of the tractor 2 using the hitch angle θ detected by the hitch angle detecting unit 216 and displaying the resulting image on the display device 213, and the like.

An embodiment of the present disclosure has been described above.

According to this embodiment, it is possible to correctly detect the hitch angle of the trailer 1 regardless of the shape of the drawbar 12 of the trailer 1. Moreover, it is possible to detect the hitch angle of the trailer 1 without furnishing the tractor 2 and the trailer 1 with special equipment, by using the rear camera 214 gaining widespread use for rear view confirmation in reversing.

In the embodiment described above, the hitch angle detecting unit 216 calculates the hitch angle by calculating the left-right direction of the trailer 1 based on a line representing the front edge of the trailer 1 that is recognized from an image captured by the rear camera 214. Here, a marker may be pasted on a position on the trailer 1 that is image-captured by the rear camera 214 such that the marker indicates the left-right direction of the trailer 1, and the hitch angle detecting unit 216 may calculate the hitch angle by recognizing the marker from an image captured by the rear camera 214 and calculating the left-right direction of the trailer 1 based on the recognized marker.

Likewise, in the embodiment described above, the hitch angle detecting unit 216 calculates the hitch angle by calculating the left-right direction of the tractor 2 based on a line representing the rear edge of the tractor 2 that is recognized from an image captured by the rear camera 214. Here, a marker may be pasted on a position on the tractor 2 that is image-captured by the rear camera 214 such that the marker indicates the left-right direction of the tractor 2, and the hitch angle detecting unit 216 may calculate the hitch angle by recognizing the marker from an image captured by the rear camera 214 and calculating the left-right direction of the tractor 2 based on the recognized marker.

Figure 6:
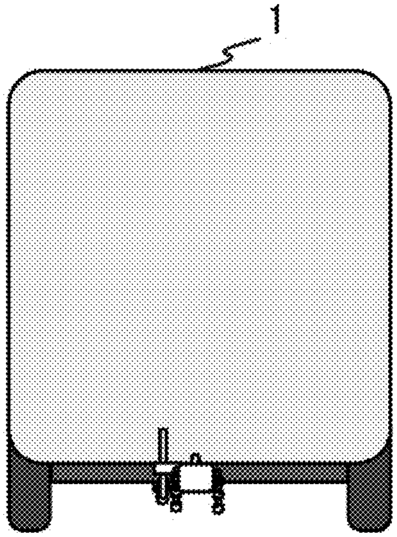
FIG. 6 is a drawing illustrating another example in which a hitch angle is detected according to an embodiment of the present disclosure.
Figure 7A:
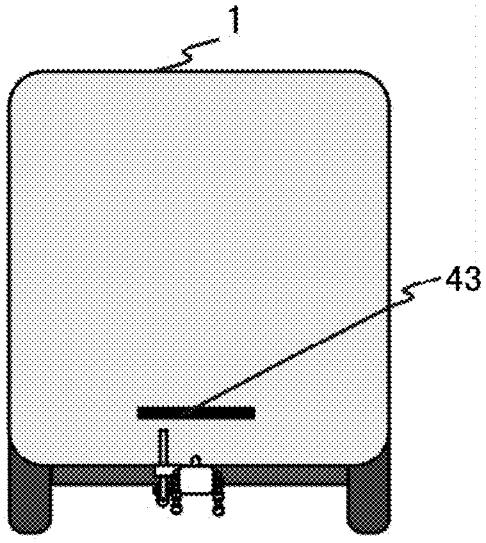
FIG. 7A is a drawing illustrating another example in which a hitch angle is detected according to an embodiment of the present disclosure.

For example, in a case of calculating the hitch angle θ by calculating the left-right direction of the tractor 2 in the same manner as in the embodiment described above and calculating the left-right direction of the trailer 1 using a marker pasted on the trailer 1, a straight line-shaped marker 43 is pasted on the front surface of the trailer 1 illustrated in FIG. 6 such that the marker 43 is parallel with the left-right direction of the trailer 1 as illustrated in FIG. 7A.

Figure 7B:
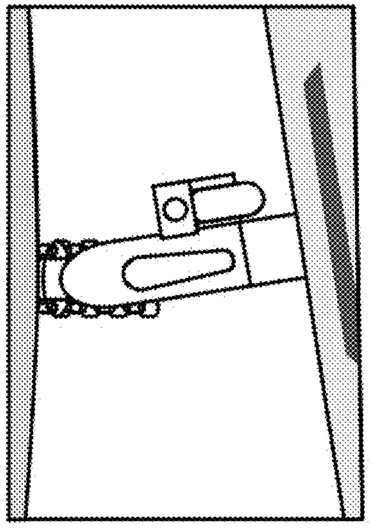
FIG. 7B is a drawing illustrating another example in which a hitch angle is detected according to an embodiment of the present disclosure.
Figure 7C:
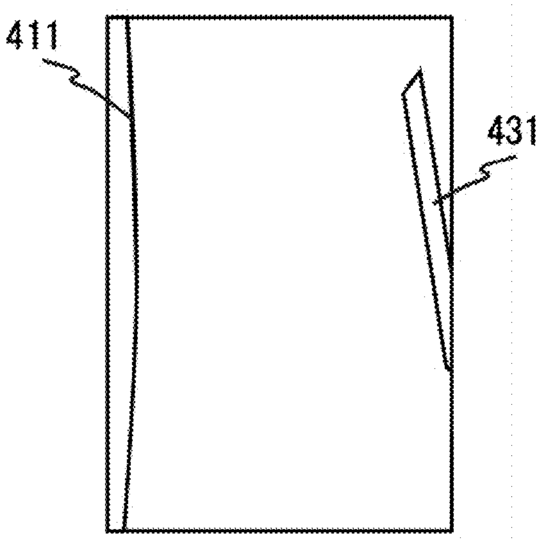
FIG. 7C is a drawing illustrating another example in which a hitch angle is detected according to an embodiment of the present disclosure.

Then, an edge 411 of the image of the rear bumper of the tractor 2 and a region 431 of the image of the marker 43 are recognized as illustrated in FIG. 7C from an image captured by the rear camera 214 illustrated in FIG. 7B.

Figure 7D:
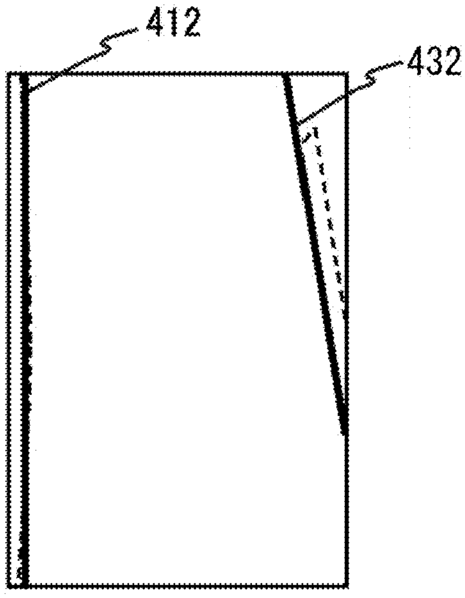
FIG. 7D is a drawing illustrating another example in which a hitch angle is detected according to an embodiment of the present disclosure.

Then, a straight line 412, with which the edge 411 of the image of the rear bumper is the best approximated, and a straight line 432, with which the longer dimension of the region 431 of the image of the marker 43 is parallel, are calculated as illustrated in FIG. 7D.

Then, the relative angle of the straight line 432 with respect to the straight line 412 is calculated as the hitch angle θ of the trailer 1.

Figure 8A:
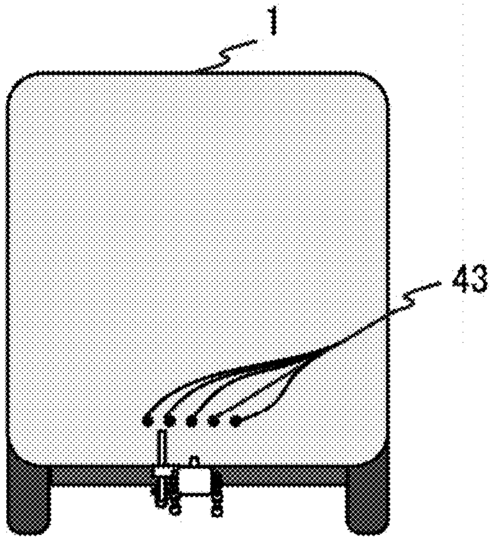
FIG. 8A is a drawing illustrating another example in which a hitch angle is detected according to an embodiment of the present disclosure.

Alternatively, in this case, for example, a plurality of markers 43 are pasted on the front surface of the trailer 1 illustrated in FIG. 6 such that the markers 43 are arranged side by side in the left-right direction of the trailer 1 as illustrated in FIG. 8A.

Figure 8B:
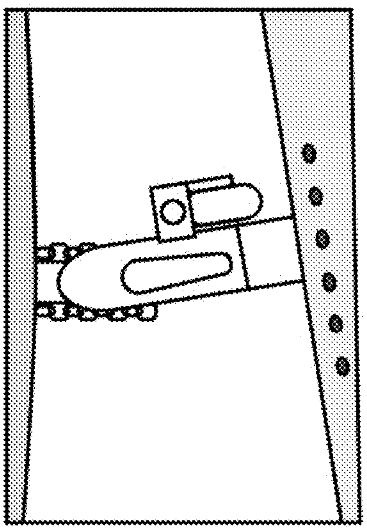
FIG. 8B is a drawing illustrating another example in which a hitch angle is detected according to an embodiment of the present disclosure.
Figure 8C:
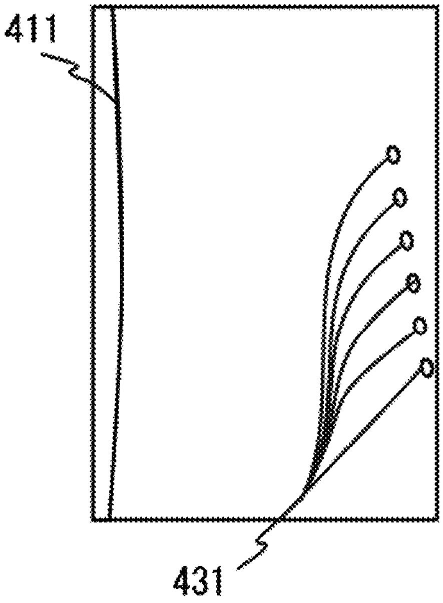
FIG. 8C is a drawing illustrating another example in which a hitch angle is detected according to an embodiment of the present disclosure.

Then, an edge 411 of the image of the rear bumper of the tractor 2 and regions 431 of the images of the markers 43 are recognized as illustrated in FIG. 8C from an image captured by the rear camera 214 illustrated in FIG. 8B.

Figure 8D:
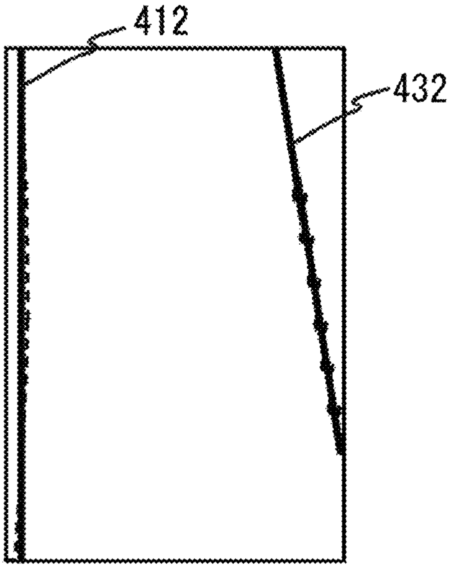
FIG. 8D is a drawing illustrating another example in which a hitch angle is detected according to an embodiment of the present disclosure.

Then, a straight line 412, with which the edge 411 of the image of the rear bumper is the best approximated, and a straight line 432 that is parallel with the direction in which the regions 431 of the images of the plurality of markers 43 are arranged side by side are calculated as illustrated in FIG. 8D.

Then, the relative angle of the straight line 432 with respect to the straight line 412 is calculated as the hitch angle θ of the trailer 1.

In a case of calculating the left-right direction of the tractor 2 by using a marker 43 pasted on the tractor 2, the marker 43 is pasted on the rear bumper or the like of the tractor 2, and the left-right direction of the tractor 2 is calculated in the same manner as in the case of the trailer 1 described above.

In this way, only by pasting the marker(s) 43 on the tractor 2 and the trailer 1 themselves, on which it is easier to secure a relatively good pasting space than to secure one on, for example, the upper surface of the drawbar 12 or the like, it is possible to detect the hitch angle θ of the trailer 1 regardless of the shape and structure of the rear end of the tractor 2 and the shape and structure of the front end of the trailer 1.

What is claimed is:

1. A hitch angle detection system configured to detect a hitch angle of a trailer pulled by a tractor, the hitch angle detection system comprising:

a camera situated on the tractor such that a front portion of the trailer is included in an image capturing range regardless of the hitch angle of the trailer;

a left-right direction calculator configured to calculate a left-right direction of the trailer based on an image of a front bumper of the trailer, the front bumper extending from a left side to a right side of the trailer, the image of the front bumper being reflected in an image captured by the camera, recognize an edge of the front bumper from the image captured by the camera, the edge representing a front edge of the trailer, and calculate, as the left-right direction of the trailer, a direction in which a straight line, obtained by approximating the recognized edge, extends; and a hitch angle calculator configured to calculate a relative angle of the left-right direction of the trailer with respect to a left-right direction of the tractor, as the hitch angle of the trailer, based on the calculated straight line.

2. The hitch angle detection system according to claim 1, wherein the camera is situated on the tractor such that a rear portion of the tractor and the front portion of the trailer are included in the image capturing range regardless of the hitch angle of the trailer, the left-right direction calculator calculates the left-right direction of the tractor based on an image of a member of the tractor extending to a left and right of the tractor, the image of the member of the tractor being reflected in the image captured by the camera, and the hitch angle calculator calculates the relative angle of the left-right direction of the trailer calculated by the left-right direction calculator with respect to the left-right direction of the tractor calculated by the left-right direction calculator as the hitch angle of the trailer.

3. The hitch angle detection system according to claim 2, wherein the member of the tractor extending to the left and the right of the tractor is a member forming a rear edge of the tractor, and the left-right direction calculator calculates a direction in which a tractor-side straight line, with which a line representing the rear edge of the tractor reflected in the image captured by the camera is approximated, extends as the left-right direction of the tractor.

4. A hitch angle detection system configured to detect a hitch angle of a trailer pulled by a tractor, the hitch angle detection system comprising:

a camera situated on the tractor such that a front portion of the trailer is included in an image capturing range regardless of the hitch angle of the trailer;

a marker fixed on a position that is on the front portion of the trailer and is included in the image capturing range of the camera such that the marker indicates a left-right direction of the trailer;

a left-right direction calculator configured to recognize a region of the marker from an image captured by the camera, and calculate, as the left-right direction of the trailer, a direction of a straight line that is parallel to a direction in which the recognized region of the marker extends; and a hitch angle calculator configured to calculate a relative angle of the left-right direction of the trailer with respect to a left-right direction of the tractor, as the hitch angle of the trailer, based on the calculated straight line.

* * * * *